United States Patent [19]

Imaoka

[11] Patent Number: 5,261,483

[45] Date of Patent: Nov. 16, 1993

[54] CONTROL SYSTEM FOR A FAN COIL OF AN AIR-CONDITIONER

[75] Inventor: Akihiro Imaoka, Fukuyama, Japan

[73] Assignee: Kabushiki Kaisha Toyo Techno Corp., Fukuyama, Japan

[21] Appl. No.: 821,433

[22] Filed: Jan. 15, 1992

[51] Int. Cl.⁵ ............................................. F25B 29/00
[52] U.S. Cl. ........................................ 165/12; 165/22; 165/27; 165/50; 236/1 C; 236/37; 236/91 F; 62/158
[58] Field of Search ................ 165/12, 27, 80, 22; 236/1 B, 1 C, 37, 91 F, 93; 62/158

[56] References Cited

U.S. PATENT DOCUMENTS

| | | | |
|---|---|---|---|
| 3,166,120 | 1/1965 | Butterfield et al. | 165/50 |
| 3,351,128 | 11/1967 | Barnd | 165/50 |
| 3,425,485 | 2/1969 | Newton | 165/50 |
| 3,537,272 | 11/1970 | Hales et al. | 62/212 |
| 4,909,308 | 3/1990 | Dreibelbis et al. | 165/27 |

FOREIGN PATENT DOCUMENTS 2-48738  4/1990  Japan .

*Primary Examiner*—John K. Ford
*Attorney, Agent, or Firm*—Thomas R. Morrison

[57] ABSTRACT

A control system for a fan coil of an air-conditioner having a fan for heat exchange, and a coil unit through which cool or hot water circulates to cool or heat the room by heat exchange with the room air, wherein an automatic change is carried out between a cooling operation and a heating operation, referring to the temperature of distributed cool or hot water detected by a water temperature sensor, and a room temperature is controlled by opening or closing an electromagnetic valve disposed in a water distribution system, referring to a room temperature detected by a room temperature sensor. When the system is turned on from its inoperative state, the electromagnetic valve is forcibly opened for a predetermined period of time for the control system for a fan coil to sufficiently detect the temperature of cool or hot water, and to prevent an erroneous change of operation.

1 Claim, 3 Drawing Sheets

CONTROL SYSTEM FOR A FAN COIL OF AN AIR-CONDITIONER

BACKGROUND OF THE INVENTION

1. Field of the Invention

The present invention relates to an improvement of a control system for a fan coil which is used for air-conditioning the inside of a room by means of a fan for heat exchanging and a coil in which cool or hot water is circulated.

2. Description of the Related Art

In a known control system for a fan coil of an air-conditioner, the cooling or heating operation is automatically activated in response to whether the monitored water temperature rises or falls to a predetermined threshold temperature. For example, when cool or hot water is below 25° C., the control system automatically changes to the cooling operation, and when cool or hot water is above 25° C., the control system automatically changes to the heating operation. The control system thereafter operates its air-conditioning in response to the difference between a target room temperature and a monitored room temperature for a set operation time. For energy saving, the target room temperature is occasionally set, for example, to 23° C. at its highest limit in the heating operation, or to 25° C. as its lowest limit in the cooling operation. At such a setting, however, neither the cooling operation nor heating operation is activated, with a room unit for which is also left inoperative, when the room temperature is, for example, 24° C., typically in mild temperature seasons. Even in this case, blowing is still needed to keep room at a comfortable temperature. Air-conditioners normally have LEDs (Light Emitting Diode) to indicate their status of heating or cooling operation. Under the above temperature setting, when the water temperature is, for example, at 25° C. or lower, air-conditioners, regardless of their inoperative status, indicate with LEDs that the cooling operation is now under way. This may mislead the user.

In view of the above-mentioned disadvantage, an improved control system for a fan coil has been proposed (see Japanese Laid-Open Utility Model Publication No. 2-48738). In such a system, an automatic switching between the heating and the cooling operation is allowed by monitoring water temperature, and a blowing operation is provided between the cooling and heating operation in order to save energy and maintain a good air temperature, and further, wherein a message on the operational status of the control system is correctly indicated so that the user is not mislead by the indication.

While, an air-conditioner as above-mentioned which performs cooling or heating by using cool or hot water, a monitored temperature of the cool or hot water serves as a reference for automatic switching from the cooling operation to heating operation, or vice versa, and the room temperature is controlled by an electromagnetic valve which opens or closes for the cool/hot water to circulate or not to circulate. Such air-conditioners suffer from the problems discussed below. During the winter, for example, a controller is set to OFF, causing an indoor fan coil unit to be inoperative, the electromagnetic valve closes blocking the flow of hot water. Hot water then gets cold enough for a water temperature sensor to signal the air-conditioner to be in the cooling operation. If the controller is now set to ON, the electromagnetic valve remains closed during automatic operation because the room temperature is low. The heating operation remains inoperative indefinitely.

OBJECTS AND SUMMARY OF THE INVENTION

In view of the above-mentioned disadvantages, it is an object of the present invention to provide a control system for a fan coil of an air-conditioner wherein cooling operation and heating operation is automatically changed based on the monitored temperature of cool/hot water, and wherein any erroneous operation is prevented, by forcing an electromagnetic valve to open for a predetermined period of time from the start of the air-conditioning so that the temperature of the cool/hot water is detected correctly.

In accomplishing these and other objects, according to the present invention, there is provided a control system for a fan coil having a fan for heat exchange, and a coil unit through which cool or hot water circulates to cool or heat a room by heat exchange with the room air, wherein an automatic change is carried out between the cooling and heating operation in response to the temperature of distributed cool or hot water detected by a temperature sensor; the room temperature is controlled by opening or closing the electromagnetic valve disposed in the distribution system in response to a room temperature signal detected by a room temperature sensor; the cooling operation is activated when the water temperature is equal to or lower than a first predetermined temperature, the heating operation is activated when the water temperature is equal to or higher than a second predetermined temperature which is higher than the first predetermined temperature, and the blowing operation is activated when the water temperature is between the first predetermined temperature and the second predetermined temperature; and wherein the operational status is forcibly indicated when the control system restarts its operation from its inoperative state, and the electromagnetic valve is forcibly opened for a predetermined duration when the control system restarts its operation from its inoperative state.

DETAILED DESCRIPTION OF THE PREFERRED EMBODIMENT

Figure 1:
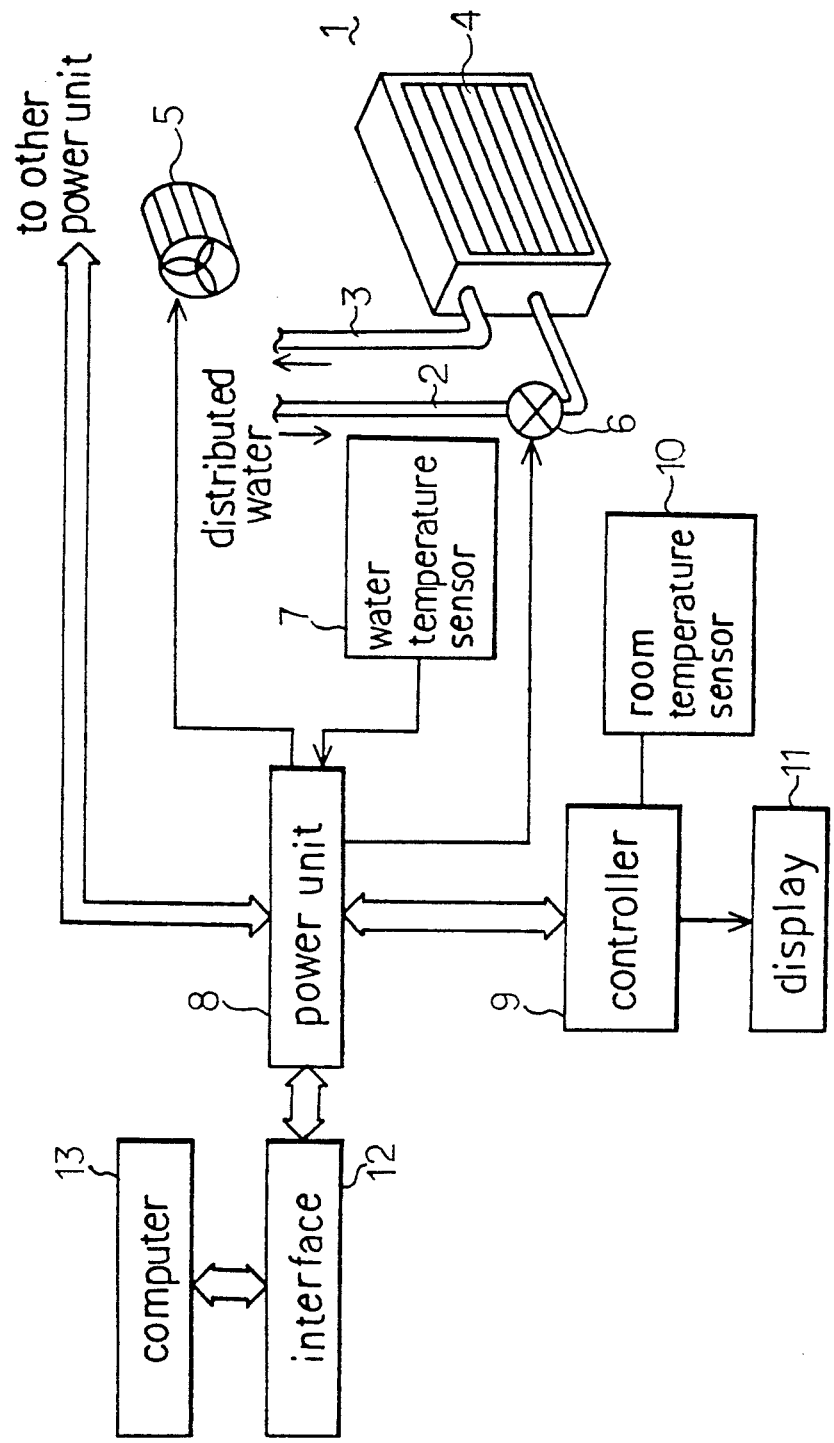
FIG. 1 is a configuration diagram showing an embodiment of a control system for a fan coil of an air-conditioner according to the present invention.

Referring now to the drawings, the embodiment of the control system for a fan coil of an air-conditioner according to the present invention is described below. FIG. 1 is a configuration diagram showing an air-conditioner system comprising the control system for a fan coil according to the present invention. A fan coil unit 1, installed inside a room, comprises a coil 4 which cool or hot water is fed to and drained from via a feed pipe 2 and a drain pipe 3 respectively, and a blowing fan 5 which performs heat exchange between the room air and cool or hot water distributed through the coil 4. Disposed onto the feed pipe 2 near its entry to the coil 4 are an electromagnetic valve 6 and a water temperature sensor 7 for detecting the temperature of cool or hot water. Each fan coil unit 1 has its own power unit 8, to which a controller 9 is connected via signal lines. The power unit 8 receives a water temperature signal from the water temperature sensor 7, and drives the blowing fan 5 and the electromagnetic valve 6. Receiving a variety of instructions and setting commands, the controller 9 communicates with the power unit 8 for signal exchange, receives a room temperature signal from a room temperature sensor 10, and drives a display unit 11.

Based on the room temperature signal from the room temperature sensor 10, the controller 9 controls the fan 5 in a stepwise manner and the electromagnetic valve 6 in an ON/OFF manner, so that the room temperature reaches a target temperature setting. The power unit 8 and thus the controller 9 as well via the power unit 8, are connected, via an interface unit 12, to a personal computer 13 which may be placed in a monitor room. Such a setup may be structured to form a network which allows centralized control for various functions including the exchange of various data, check of the room temperature, modification or check of the target temperature, modification or check of the mode of operation.

Figure 2:
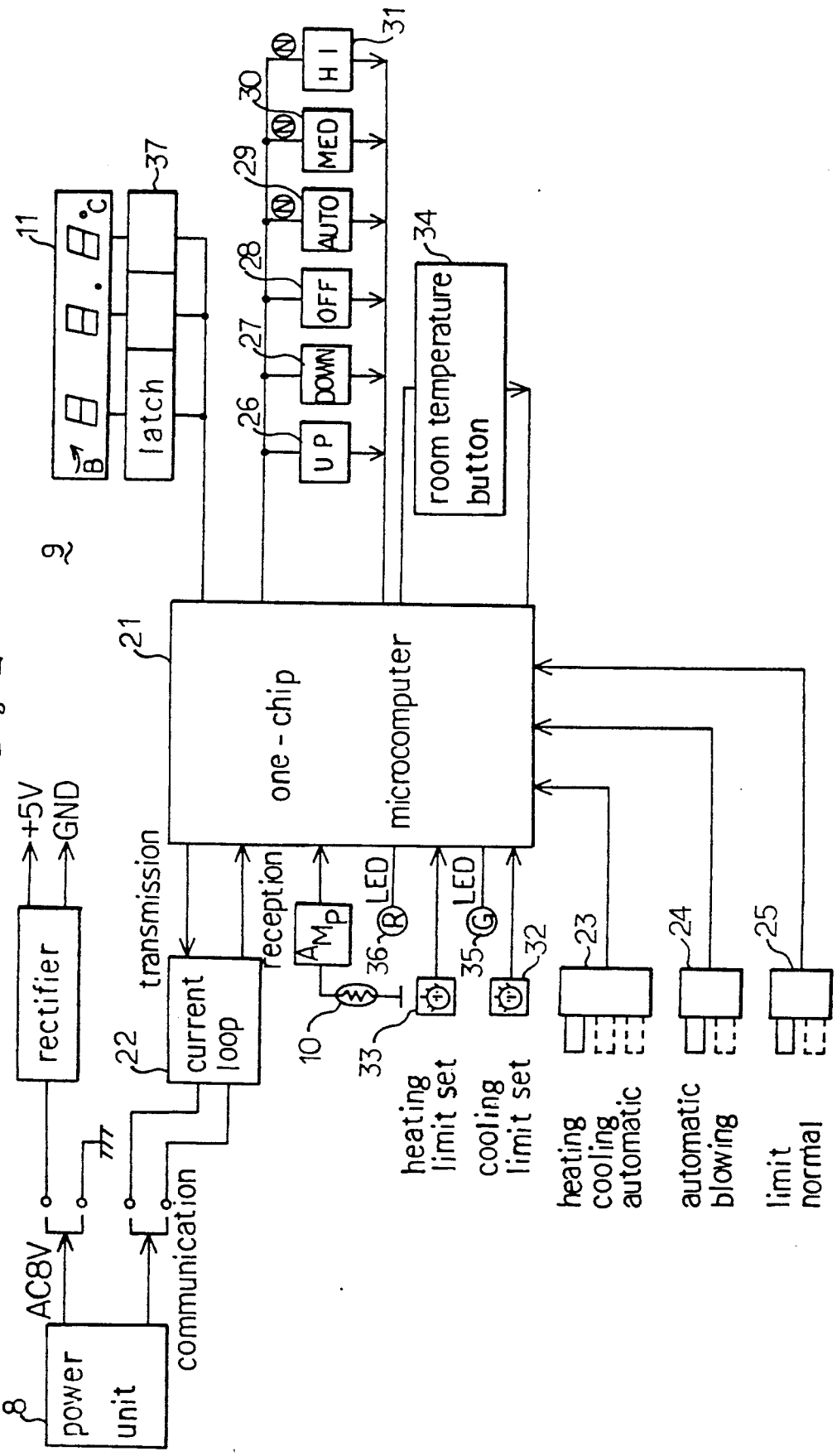
FIG. 2 is a configuration diagram showing the controller of the control system.
Figure 3:
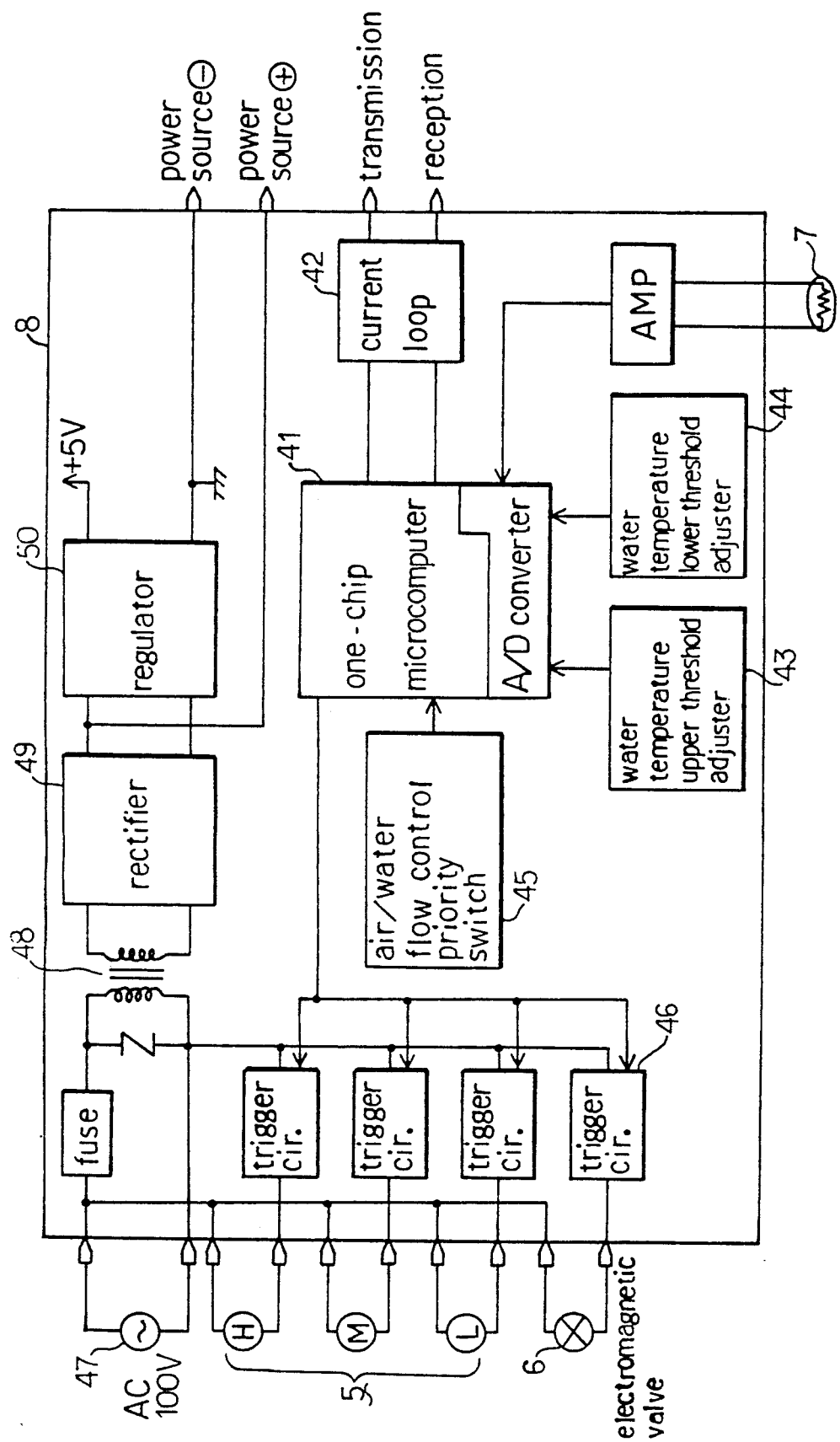
FIG. 3 is a configuration diagram showing the power unit of the control system.

FIG. 2 shows the configuration of the controller 9. FIG. 3 shows the configuration of the power unit 8. The controller 9 is now described referring to FIG. 2. A one-chip microcomputer 21 communicates with a microcomputer in the power unit 8, via current loop 22 which includes an analog-to-digital converter. The controller 9 has an operation panel through which a variety of instructions are entered as follows: A mode switch 23, having cooling, heating, and automatic positions, is used to change the mode of operation. When the switch 23 is set to "automatic," the mode of operation is automatically changed as follows: the cooling operation is activated when the detected temperature of distributed water is at 20° C. or lower (that is a first predetermined threshold temperature), the heating operation is activated when the detected temperature is at 35° C. or higher (that is a second predetermined threshold temperature), and the blowing operation is activated when the detected temperature is between 20° C. and 35° C.

A manual switch 24 has automatic and blowing positions. When the manual switch 24 is set to "automatic," the automatic operation for cooling or heating mentioned above has a priority, and when the manual switch 24 is set to "blowing," the blowing operation overrides the automatic operation. A limit switch 25 has normal and limit positions. When the limit switch 25 is set to "normal," the display unit 11 indicates a target temperature set in the cooling or heating operation, and when the limit switch 25 is set to "limit," the display unit 11 indicates the lowest limit temperature set in the cooling operation or the highest limit temperature set in the heating operation. Both an UP button 26 and a DOWN button 27 are used to set or modify the target room temperature. An OFF button 28 is used to reset all functions to OFF.

Three buttons, AUTO 29, MED 30, and HI 31, available for the control of air-flow rate, change the speed of the fan 5 to automatic, middle, or high speed. Depending on the difference between the target temperature and the detected temperature, both the speed of the fan 5 and the electromagnetic valve 6 are automatically controlled at each air flow rate. The air flow rate selected is indicated by LEDs. A cooling limit setting resistor 32 and a heating limit setting resistor 33 are used to set the cooling (room) temperature limit allowable and the heating (room) temperature limit allowable, both adjustable between 15° C. and 30° C. For example, when the switch 23 is set to "cooling," the switch 24 is set to "automatic," the switch 25 is set to "limit," and the cooling limit setting resistor 32 is set to 23° C., the temperature set range for the cooling operation is 23° C. to 30° C. Also, when the switch 23 is set to "heating," both switches 24 and 25 remain unchanged from the above settings. The heating limit setting resistor 33 is set to 26° C., the temperature set range for the heating operation is 15° C. to 26° C.

A room temperature button 34, causes the display unit 11 to indicate the room temperature instead of the target temperature only while it is pressed. The output from the room temperature sensor 10 is fed to the microcomputer 21 via an amplifier AMP. In accordance with the instructions from the microcomputer 21, a cooling lamp (LED) 35 lights when the detected temperature of cooling or hot water is at 20° C. or lower, a heating lamp (LED) 36 lights when the detected temperature is at 35° C. or higher, and the display unit 11 made of LCD (Liquid Crystal Display) is driven via a latch circuit 36. Normally the display unit 11 indicates digitally the target temperature setting. Depending on how the control button manipulated, the display unit 11 indicates the room temperature, the temperature of cool or hot water, and the threshold temperature for cooling or heating. When the blowing operation is under way, the display unit shows an arrow mark as in FIG. 2. When a lithium battery, if employed, comes to the end of its service life, the letter "B" is indicated on the display unit 11; the battery supplies power to a memory which stores settings like the target temperature and the set air flow rate, so that, in case of power interruption, the system can return back to the previous settings immediately after power is recovered.

Referring to FIG. 3, the power unit 8 is now described below. A one-chip microcomputer 41 connects to the microcomputer 21 in the controller 9 via a current loop 42 which includes a digital-to-analog converter. The microcomputer 41 is supplied with the output from the water temperature sensor 7 via the amplifier (AMP) and an analog-to-digital converter. The microcomputer 41 is also supplied with the setting information of water-temperature upper and lower threshold adjusters 43 and 44, which set threshold temperatures for changing the cooling and heating operations in response to the detected water temperature. The microcomputer 41 is further supplied with the selection signal from an air-flow control/water-flow control priority switch 45. The upper threshold (water) temperature for the cooling operation described above is adjustable within a temperature range of 20° C.±5° C. The lower threshold (water) temperature for the heating operation is adjustable within a temperature range of 35° C.±5° C. The blowing operation takes place when the water temperature detected falls somewhere between the two threshold temperatures. The priority switch 45 gives selectively a priority to either an air-flow control or a water-flow control. When the air-flow control is selected, the room temperature is controlled at one of three air-flow rates (AUTO, MED, HI) in use. When the water-flow control is selected, if the electromagnetic valve 6 is open, the fan operates in one of three air-flow rates (AUTO, MED, HI) in use, and if the electromagnetic valve 6 is closed, the fan operates at LOW.

The microcomputer 41 feeds its outputs via trigger circuits 46 to a motor which drives the fan 5, controlling the motor speed by a phase control or by change-over using a tap. The microcomputer 41 controls the electromagnetic valve 6 to be open or closed so that the amount of water flow can be changed. The power unit 8 contains a power supply circuit having a power transformer 48, to which a AC power source 47 is supplied, a rectifier circuit 49, and a voltage regulator circuit 50. The power unit 8 supplies DC currents to the electronics including microcomputers. The controller 9 is provided with a jumper wire switch (not shown). When a memory backup battery for a power interruption is provided, the jumper wire switch works, according to its setting, to select OFF or AUTO in the air-flow rate settings when power is recovered.

According to the embodiment mentioned above, the air-conditioning system automatically changes between the cooling, heating, and blowing operations, depending on the water temperature detected, with the present mode of operation being indicated. The system is thus free from such disadvantages of prior art systems such that, in mild temperature seasons, the fan remains inoperative even though there is an indication reporting that the cooling operation is under way. By changing over the air-flow control/water-flow control priority switch 45, if the priority switch 45 is set to the air-flow control, the water-flow control is subordinate, if the priority switch 45 is set to the water-flow control, the air-flow control is subordinate, so that the control of the room temperature is properly performed, limiting over-cooling and over-heating, and thereby helping to save energy.

Since the air-conditioner system is operated in a manner that the blowing operation is carried out when the detected water temperature is between the first and the second temperatures, the following advantage results: Supposing that no blowing operation is provided when the electromagnetic valve is closed in the automatic mode, cool or hot water stops flowing, then the temperature of cool or hot water may vary sufficiently enough to change the operating mode between the cooling operation and the heating operation. For example, when the room temperature reaches the target temperature setting during the heating operation in winter, the electromagnetic valve is closed. At the moment that the room temperature falls below the target temperature setting by 0.5° C. (note that a hysteresis is provided to prevent chattering), the electromagnetic valve is opened and the system restarts its operation. Accordingly, the heating operation is restricted if the room temperature falls to the starting temperature at which the heating operation started. If, before the room temperature falls to the starting temperature, hot water is cooled by natural heat radiation, the water temperature sensor 7 detects such a change, and then, the system erroneously changes to the cooling operation (along with its indication reporting cooling operation). The electromagnetic valve remains closed in the cooling operation. Also, the fan coil remains inoperative, and the system is halted in the cooling operation, without having the room.

On the contrary, according to the present invention, in case of the above, the system changes to the blowing operation rather than the cooling operation since the blowing operation is provided between the cooling operation and the heating operation. As the electromagnetic valve is designed to open during the blowing operation, the water begins to flow. Then, the water temperature rises to start the heating operation again. The above-mentioned problem does not occur and the system does not indicate a message reporting the cooling operation in the heating operation.

Furthermore, according to the present invention, the electromagnetic valve is forcibly opened for a predetermined period of time (60 seconds, for example) when the system is turned on from its inoperative state. Because of this period allowed, the system detects sufficiently the temperature of cool or hot water; thus, erroneous change of operation is prevented when the system operates in an automatic change between the cooling and heating operations referring to the detected water temperature.

Furthermore, as the air-flow control/water-flow control priority switch 45 is incorporated, the following advantage is achieved. There are two types of fan coils, one is with an electromagnetic valve and the other is without the valve. In case of the fan coil without the electromagnetic valve, since cool or hot water is circulated in a continuous manner, the air-flow control has priority. Therefore, the air-conditioning is stopped by stopping the fan when the room temperature reaches the target temperature. When the fan coil with an electromagnetic valve, the water-flow control has priority, and the air-conditioning is stopped by blocking cool or hot water by having the electromagnetic valve is operative closed when the room temperature reaches the target temperature. The fan is left rotating at a slow speed. A slowly rotating fan prevents dew from condensing which could happen during the cooling operation. As mentioned above, two kinds of priority can be adapted to either of two fan coil types, so that the selection of suitable controls can be achieved.

In the above embodiment, a two pipe system (a feed pipe 2 and a drain pipe 3) for the distribution of water is employed. The air-conditioning system is upgraded if a four pipe system having separate pipes for distributing cool water and hot water is employed, and an automatic switchover is performed between the cooling operation and the heating operation, referring to a room temperature sensor.

Furthermore, the air-conditioning is performed at a comfortable temperature level, achieving an energy savings. If the system is designed to proceed, when power is recovered after an interruption of power, to an automatic setting such as the cooling target temperature is set to a temperature as high as the cooling temperature lower limit +2.5° C., and the heating target temperature is set to a temperature as low as the heating temperature upper limit −2.5° C.

Furthermore, the effect of labor saving and energy saving is enhanced by means of an automatic operation, if a network facility is added to the control of the fan coil control. For example, each air-conditioner system may be controlled from the corresponding controller in an individual room. A centralized control panel remotely positioned may monitor room temperatures, temperature settings, operational status of individual rooms, and the centralized control panel may allow an operator to remotely control the individual air-conditioning systems. Also, the centralized control panel may also have a locking function so that local control is temporarily prohibited.

According to the control system for a fan coil of the present invention mentioned above, an automatic change between the cooling and heating operation is carried out, referring to the temperature of cool or hot water detected by a water temperature sensor, and the blowing operation is performed when the detected temperature falls between an upper threshold water temperature (the first predetermined temperature) at which the cooling operation is activated and a lower threshold water temperature (the second predetermined temperature) at which the heating operation is activated. Therefore, the control system for a fan coil brings about the advantage that no particular maintenance is needed, providing a comfortable air-conditioning, enhancing energy saving as a result of efficient operation, and satisfying the needs of the user who wants only the blowing operation especially in mild temperature seasons. The user can correctly recognize the operational status, because correct operational status is indicated on a display. The electromagnetic valve is forcibly opened for a predetermined period of time when the system is turned on from its inoperative state so that the system detects sufficiently the temperature of cool water or hot water; thus, erroneous change of operation is prevented when the system operates in automatically between the cooling and heating operations.

The control system for a fan coil is operated in response to the room target temperature in an automatic mode, using the air-flow control in combination with the water-flow control, eliminating both over-cooling and over-heating, and thus achieving more energy savings.

What is claimed is:

1. A control system regulating the temperature of a room by heat exchanging with the air of said room utilizing a fan coil of an air conditioner comprising:

a coil along a water distribution path through which water passes;

a fan for blowing air through said coil;

a water temperature sensor for detecting a water temperature of said water;

a room temperature sensor for detecting a room temperature of said room;

an electromagnetic valve disposed in said water distribution path being effective to open and close responsive to a room temperature signal from said room temperature sensor;

means for selecting between a water-flow control and an air-flow control;

said water-flow control being effective to control the opening and closing of said electromagnetic valve based on the temperature difference between a target temperature and said room temperature, said fan being responsive to the activity of said electromagnetic valve;

said air-flow control being effective to control the rotation of said fan based on the temperature difference between said target temperature and said room temperature, said electromagnetic valve being nonresponsive to the activity of said fan;

means for changing automatically among a cooling operation, a heating operation, and a blowing operation, responsive to said water temperature;

said cooling operation is activated when the temperature of said water is equal to or lower than a first predetermined temperature;

said heating operation is activated when the temperature of said water is equal to or higher than a second predetermined temperature, said second predetermined temperature being higher than said first predetermined temperature;

said blowing operation is activated when the temperature of said water is between said first predetermined temperature and said second predetermined temperature;

an indicator;

means for forcibly indicating the status of each operation when an operation of said control system is restarted from an inoperative state, on said indicator;

means for opening said electromagnetic valve for a predetermined duration when an operation of said control system is restarted from an inoperative state, irrespective of said water temperature at the time of energizing said control system.

* * * * *